US011356196B2

(12) United States Patent
Wey et al.

(10) Patent No.: US 11,356,196 B2
(45) Date of Patent: Jun. 7, 2022

(54) RECONFIGURABLE ADAPTIVE FORWARD ERROR CORRECTION

(71) Applicant: ZTE Corporation, Guangdong (CN)

(72) Inventors: Jun Shan Wey, Sammamish, WA (US); Junwen Zhang, Randolph, NJ (US); Zheng Liu, Shanghai (CN); Weiliang Zhang, Shanghai (CN)

(73) Assignee: ZTE Corporation, Shenzhen (CN)

( * ) Notice: Subject to any disclaimer, the term of this patent is extended or adjusted under 35 U.S.C. 154(b) by 27 days.

(21) Appl. No.: 16/976,446

(22) PCT Filed: Mar. 2, 2019

(86) PCT No.: PCT/US2019/020458
§ 371 (c)(1),
(2) Date: Aug. 27, 2020

(87) PCT Pub. No.: WO2019/169373
PCT Pub. Date: Sep. 6, 2019

(65) Prior Publication Data
US 2021/0050939 A1   Feb. 18, 2021

(30) Foreign Application Priority Data

Mar. 2, 2018   (WO) ................ PCT/CN2018/077858

(51) Int. Cl.
*H04L 1/00*   (2006.01)
(52) U.S. Cl.
CPC .......... *H04L 1/0041* (2013.01); *H04L 1/0045* (2013.01); *H04L 1/0083* (2013.01)

(58) Field of Classification Search
CPC .... H04L 1/0045; H04L 1/0046; H04L 1/0083
See application file for complete search history.

(56) References Cited

U.S. PATENT DOCUMENTS

| | | | |
|---|---|---|---|
| 9,231,721 | B1 | 1/2016 | Varadarajan et al. |
| 2005/0149821 | A1 | 7/2005 | Lee et al. |
| 2010/0296811 | A1 | 11/2010 | Ohira et al. |
| 2010/0316381 | A1* | 12/2010 | de Lind van Wijngaarden ......... H04J 3/1694 398/58 |
| 2012/0002961 | A1 | 1/2012 | De Lind van Wijngaarden |
| 2012/0008940 | A1 | 1/2012 | De Lind van Wijngaarden |

(Continued)

FOREIGN PATENT DOCUMENTS

CN   102461042 A   5/2012

OTHER PUBLICATIONS

ISA/KR, International Search Report and Written Opinion for PCT/US2019/020458, dated Jul. 9, 2019.

(Continued)

*Primary Examiner* — Shelly A Chase
(74) *Attorney, Agent, or Firm* — Perkins Coie LLP

(57) ABSTRACT

A method of communication using a forward error correction (FEC) code includes receiving, at an optical line terminal (OLT), performance capability information provided by an optical network unit (ONU), adjusting, at the OLT, a ratio between an FEC code size and a payload size based on the performance capability information, and informing the ONU of the FEC code size selected based on the ratio such that message exchanges between the ONU and the OLT are performed using the FEC code size to which the ratio is applied.

20 Claims, 13 Drawing Sheets

(56) References Cited

U.S. PATENT DOCUMENTS

2013/0156420 A1\* 6/2013 Amitai ............... H04B 10/5055
398/27
2017/0070314 A1\* 3/2017 Effenberger .......... H04L 1/0064

OTHER PUBLICATIONS

Office Action for CN Application No. 2019800168357, dated Aug. 17, 2021, 19 pages (with unofficial translation).

\* cited by examiner

RECONFIGURABLE ADAPTIVE FORWARD ERROR CORRECTION

CROSS REFERENCE TO RELATED APPLICATIONS

This patent application is a U.S. National Application filed under 35 U.S.C. § 371 of International Patent Application No. PCT/US2019/020458, filed on Mar. 2, 2019, which claims the benefit of priority to International Patent Application No. PCT/CN2018/077858, filed on Mar. 2, 2018. The entire content of the before-mentioned patent applications is incorporated by reference as part of the disclosure of this application.

TECHNICAL FIELD

The present document relates to optical communication systems.

BACKGROUND

In recent years, telecommunication technologies using fiber optics are being developed rapidly. There are various types of systems that make fiber optics broadband connection possible. A passive optical network (PON), among others, consists of an Optical Line Terminal (OLT) at the communication company and a number of Optical Network Units (ONUs) at end users. Different ONUs may have different data rates or different modulation formats (e.g., NRZ, PAM-4, PAM-8, etc.). In future PON systems, different ONUs may have different requirements/tolerance levels of performance. For example, when a frame bursting scheme is used to achieve higher throughput by allowing a transmitter to send a series of frames in succession, different ONUs may have different levels of performance in terms of forward error correction (FEC) codeword, and thus there is a possibility that some ONUs might need to send a burst frame exceeding one FEC codeword length.

SUMMARY

The present document discloses, among other things, techniques for changing FEC overhead length to adjust the throughput for different ONUs in the upstream direction. In another advantageous aspect, the FEC overhead length may be adjusted by using shortening techniques or puncturing techniques.

In one example aspect, a method of communication using a forward error correction (FEC) code includes receiving, at an optical line terminal (OLT), performance capability information provided by an optical network unit (ONU), adjusting, at the OLT, a ratio between an FEC code size and a payload size based on the performance capability information, and informing the ONU of the FEC code size selected based on the ratio such that message exchanges between the ONU and the OLT are performed using the FEC code size to which the ratio is applied.

In another example aspect, a method of communication between at least two parties using a forward error correction (FEC) code includes sending a request to another party of the communication to adjust a ratio between FEC code size and payload size, receiving a confirmation regarding the adjustment from the another party of the communication, and exchanging messages with the another party who has sent the confirmation.

In yet another example aspect, a method of communication between at least two parties using a forward error correction (FEC) code includes informing another party of the communication of adjusting a ratio between FEC code size and payload size, and exchanging messages with the another party who has been informed of the adjustment.

In yet another example aspect, an optical transceiver apparatus includes an I/O interface coupled via an optical transmission medium to another optical transceiver apparatus, a memory to store executable instructions, and a processor in communication with the receiver. The processor is configured to read the executable instructions from the memory to receive performance capability information provided by the another optical transceiver apparatus, adjust a ratio between a forward error correction (FEC) code size and a payload size based on the performance capability information, and inform the another optical transceiver apparatus of the FEC code size selected based on the ratio such that message exchanges between the optical transceiver apparatuses are performed using the FEC code size to which the ratio is applied.

In yet another example aspect, a computer program product comprising a computer readable memory having executable instructions stored thereupon. The executable instructions, when executed, causes a processor to receive, at an optical line terminal (OLT), performance capability information provided by an optical network unit (ONU), adjust, at the OLT, a ratio between an FEC code size and a payload size based on the performance capability information, and inform the another optical transceiver apparatus of the FEC code size selected based on the ratio such that message exchanges between the optical transceiver apparatuses are performed using the FEC code size to which the ratio is applied.

These and other aspects, and their implementations and variations are set forth in the drawings, the description and the claims.

DETAILED DESCRIPTION

In a passive optical network (PON), a single optical network may serve different ONUs having different requirements/tolerance levels of performance. A frame bursting scheme allows a transmitter to send a series of frames in succession to different ONUs having different levels of performance in terms of forward error correction (FEC) codeword.

Figure 1:
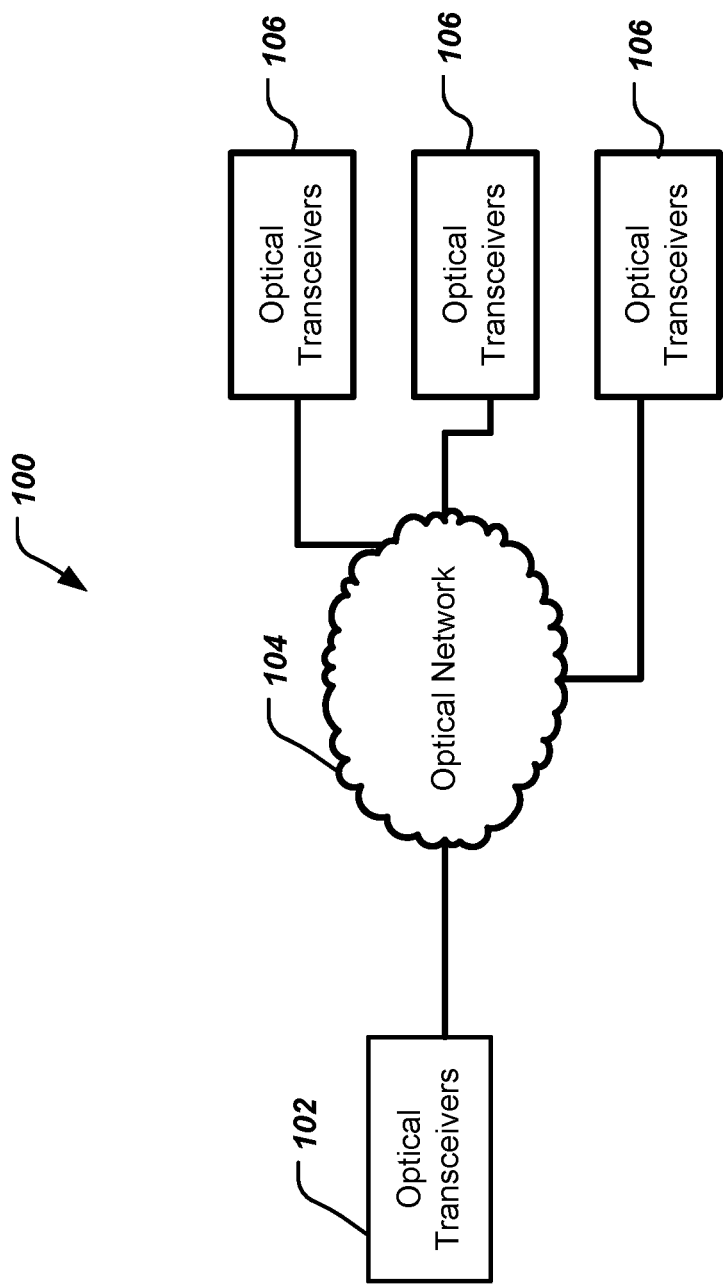
FIG. 1 illustrates an example optical communication network.

FIG. 1 illustrates an example optical communication network in which the presently disclosed technology can be embodied. One or more optical transceivers 102 are communicatively coupled via an optical network 104 with one or more optical transceivers 106. Examples of the optical network 104 may include PON. The optical network 104 may include optical fibers that extend in length from several hundred meters (e.g., last mile drop) to several thousands of kilometers (long haul networks). In some embodiments, the optical transceiver 102 may include Optical Line Terminal (OLT), and the optical transceiver 106 may include Optical Network Units (ONU). The transmitted optical signals may go through intermediate optical equipment such as amplifiers, repeaters, switch, etc., which are not shown in FIG. 1 for clarity.

Figure 2A:
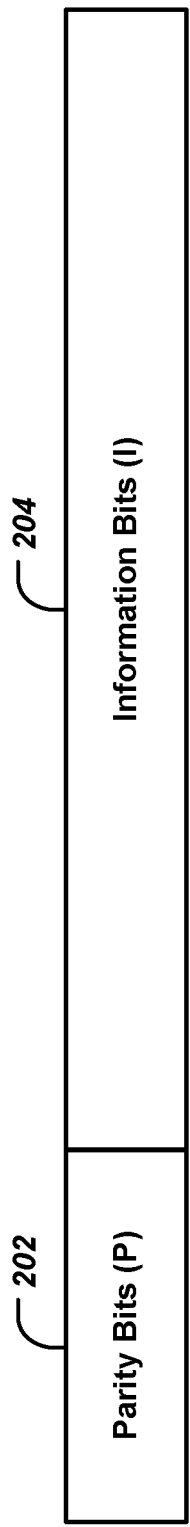
FIG. 2A illustrates a configuration of typical codewords.
Figure 2B:
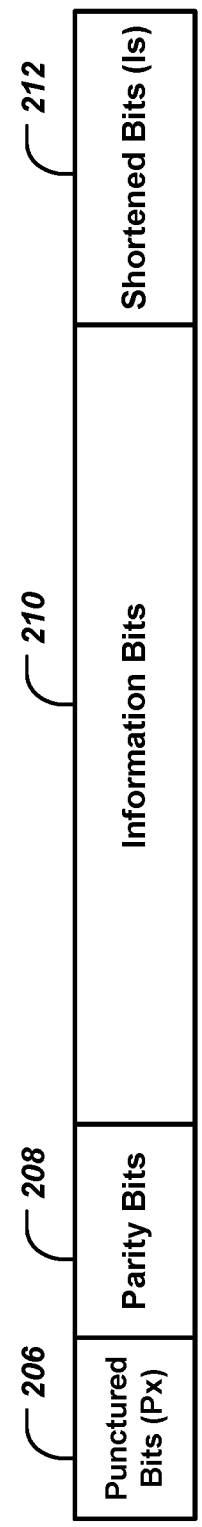
FIG. 2B illustrates an example configuration of codeword to which shortening techniques and puncturing techniques are applied.

FIG. 2A illustrates a configuration of typical codewords, and FIG. 2B illustrates an example configuration of codeword to which shortening techniques and puncturing techniques are applied. Referring to FIG. 2A, a codeword in PON consists of parity bits 202 and information bits 204. As illustrated in FIG. 2B, a codeword based on some embodiments of the disclosed technology may include punctured bits 206, parity bits 208, information bits 210, and shortened bits 212. In FIG. 2B, the length of the parity bits 208 can be expressed as "P-Px," and the length of the information bits 210 can be expressed as "I-Is."

Puncturing is a technique to reduce codeword length by removing some of the parity bits (e.g., punctured bits 206). By doing so, it increases the code rate. Because the size of parity bits is reduced, however, the error performance decreases. Shortening is a technique that reduces the length of information bits of a codeword. When the information bits contain zero bits padded at the end, the zero bits (e.g., shortened bits 212) can be deleted before transmission to improve transmission throughput. The shortening techniques, however, will reduce the code rate.

Various embodiments of the disclosed technology change FEC overhead length by using shortening and/or puncturing to adjust the throughput for different ONUs in an upstream (US) direction. If the ONU performance changes (e.g., due to aging, environmental condition, etc.), its throughput will need to be adjusted.

In an embodiment, where wavelength division multiplexing is used in a downstream, the OLT may include dual rate receivers. Examples of the dual rate receiver may include 25G/10G dual rate receiver (e.g., 25G uses low-density parity-check code [LDPC]/Reed-Solomon code [RS], 10G RS), 50G/25G dual rate receiver (e.g., both use LDPC/RS that can use different codeword size), and 50G/10G dual rate receiver (e.g., 50G uses LDPC/RS, 10G RS). Here, different modulation formats (NRZ, PAM4, PAM8, etc.) may be used for different data rates.

In another embodiment, for a PON system with the ONUs at the same data rate, a ratio between upstream forward error correction (FEC) and payload (e.g., data field) is determined by the ONU's performance capability. If a first ONU has lower performance, or if the first ONU is situated at longer distance than a second ONU from the OLT, then the first ONU needs to have a high FEC coding gain (to compensate for the loss) and a high overhead (OH)/payload ratio. Here, shortening can be used to reduce the payload length to decrease the throughput (OH/payload ratio increased). If the first ONU has a high performance, or if the first ONU is situated at a short distance than the second ONU from the OLT, then the first ONU may have a low FEC coding gain and low OH/payload ratio. Here, the overhead (e.g. puncturing) can be reduced to increase the throughput (OH/payload ratio reduced).

Figure 3:
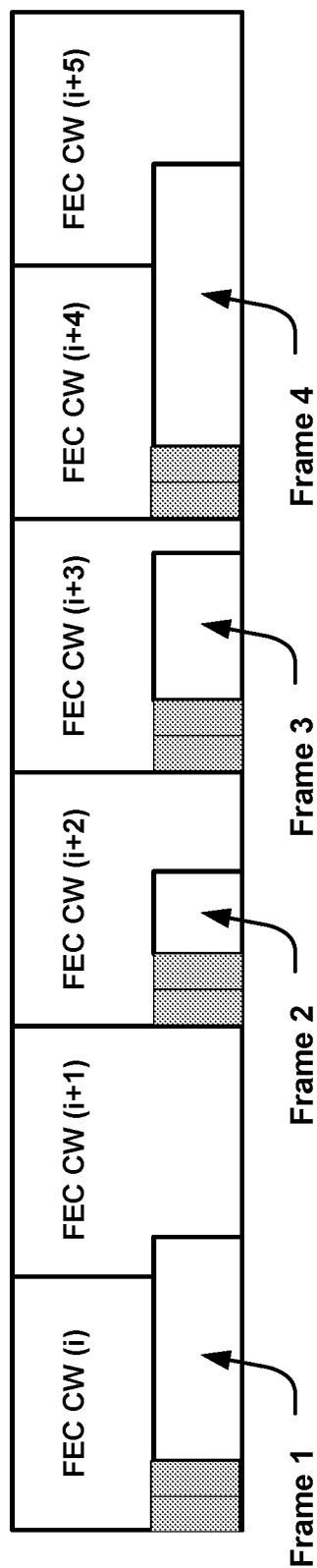
FIG. 3 shows forward error correction (FEC) codeword matching within one burst frame.

FIG. 3 shows situations where FEC codeword is longer than one burst frame and situations where FEC codeword is shorter than one burst frame. Looking at frames 2 and 3, if the length of a frame is shorter than the length of one FEC codeword, one or both of the shortening technique of payload bits and the puncturing technique of parity bits can be used to match FEC within one burst frame. Looking at frame 4, if the length of a frame is shorter than the length of one FEC codeword, fifth FEC codeword (FEC CW i+4) takes the first part of frame 4, and sixth FEC codeword (FEC CW i+5) performs the shortening and/or puncturing to fit within the frame 4.

Figure 4:
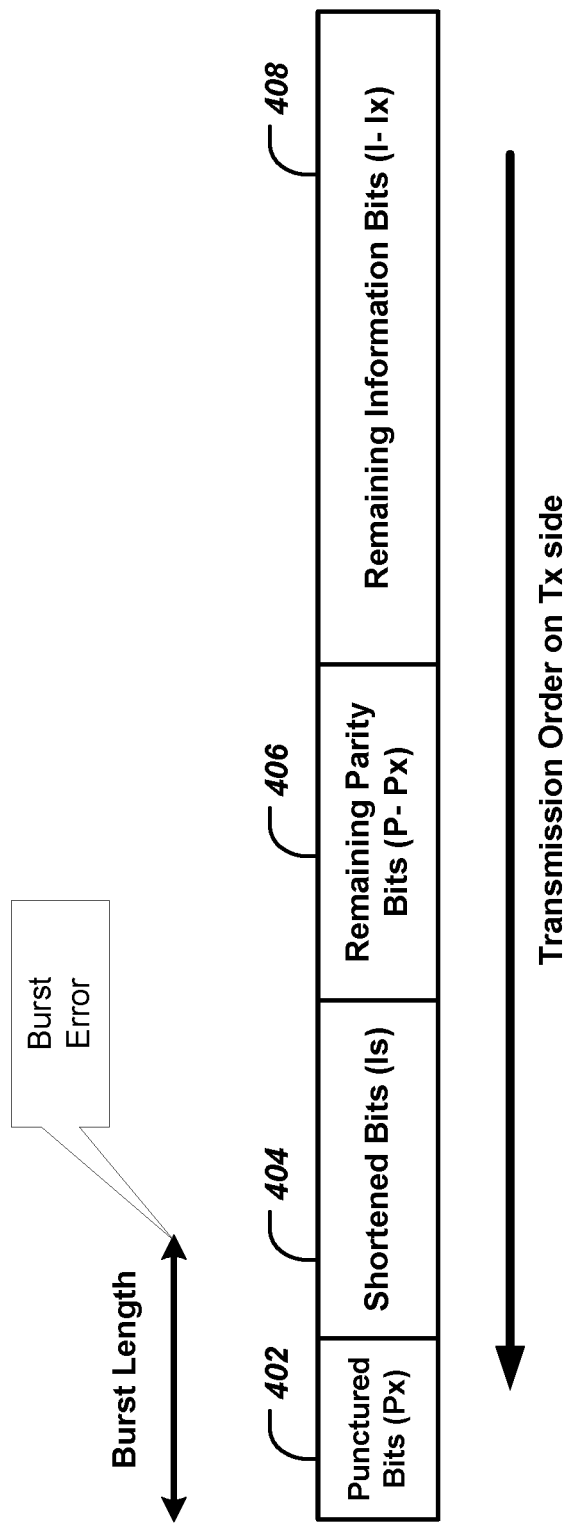
FIG. 4 shows how puncturing and shortening techniques can mitigate upstream burst errors caused by phase-locked loop (PLL) lockout.

FIG. 4 shows how puncturing and shortening techniques can mitigate upstream burst errors caused by phase-locked loop (PLL) lock-out. Burst errors typically occur at the beginning of a codeword due to the loss of phase locking (PLL lock-out). When data bits are transmitted from a transmitter side in an order of most-significant-bit (MSB) and least-significant-bit (LSB), punctured bits (Px) 402 are transmitted first, followed by shortened bits (Is) 404, remaining parity bits (P-Px) 406, and the remaining information bits (I-Is) 408. In an embodiment of the disclosed technology, the punctured bits (Px) 402 and the shortened bits (Is) 404 may be adjusted to fit within a burst length (BL). If BL is equal to or shorter than the length of parity bits (P), then the punctured bits (Px) 402 is set to be equal to BL, and the shortened bits (Is) 408 is set to be equal to or longer than zero and shorter than (0.85/0.15)Px. If BL is longer than the length (P) of parity bits 404, then the punctured bits (Px) 402 is set to be equal to "2816" and the shortened bits (Is) 408 is set to be equal to "BL-P."

By adjusting the punctured bits (Px) and the shortened bits (Is), the disclosed technology may achieve a target bit error rate, minimize the forward error correction overhead, and maximize the data throughput, while not exceeding a maximum system latency requirement. Those reconfigurations may be centrally controlled by the OLT. Alternatively, the control of the reconfigurations may be distributed among the OLT and the ONUs.

Figure 5:
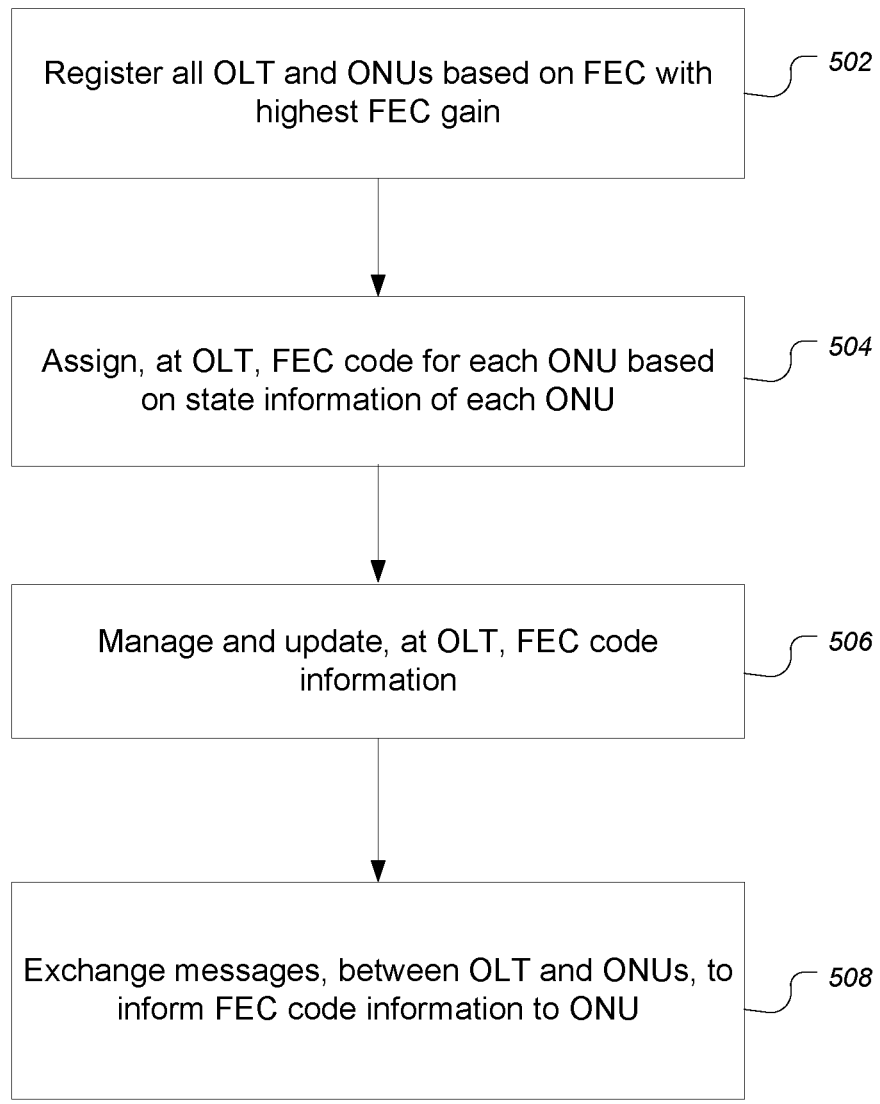
FIG. 5 shows an implementation example of centralized control at an optical line terminal (OLT).

FIG. 5 shows an implementation example of centralized control at the OLT. In the centralized control scheme, the OLT makes all the decisions relating to FEC code based on the information provided by the ONU during registration. For example, the OLT makes the decisions based on which FEC code is needed for each ONU. At step 502, registration processing is performed based on the specific FEC with the highest performance (e.g., highest FEC gain) to ensure the system will work. At step 504, the OLT assigns the FEC code for each ONU based on state information of each ONU. The OLT decides which FEC code is needed for each ONU based on the information provided by the ONU during registration (e.g., channel states, distance, etc.). At step 506, the OLT manages and updates FEC code information. The FEC coding Information for each ONU in downstream (DS) and upstream (US) is stored the OLT, managed and updated by the OLT. At step 508, messages may be exchanged between the OLT and the ONUs to inform the FEC code information to the ONU. The ONUs may be informed about the FEC coding information during the registration or after registration by message exchanges. Each ONU will get the FEC coding and decoding information for itself from the OLT.

Distributed control is more flexible in that both the OLT and the ONU can make changes. Even ONUs may decide whether the changes in the FEC is necessary based on, e.g., its performance, state, service, and power consumption. There are three ways that the distributed control mode changes the FEC in the PON. First, the OLT (or ONU) may make request first, and then may confirm the changes that will be made to the FEC. Secondly, the OLT (or ONU) may inform the ONU (or OLT) that the OLT (or ONU) will make changes to the FEC, and then the changes take place in the next frame without the need for confirmation. Thirdly, the OLT (or ONU) may make the change and indicate the specifics in a frame header (e.g., preamble). Here, new FEC configurations and information thereof may be in the same frame. Like the centralized control scheme, the registration processing in the distributed control scheme may be performed based on the specific FEC with the highest performance (e.g., highest FEC gain) to ensure the system will work.

Figure 6:
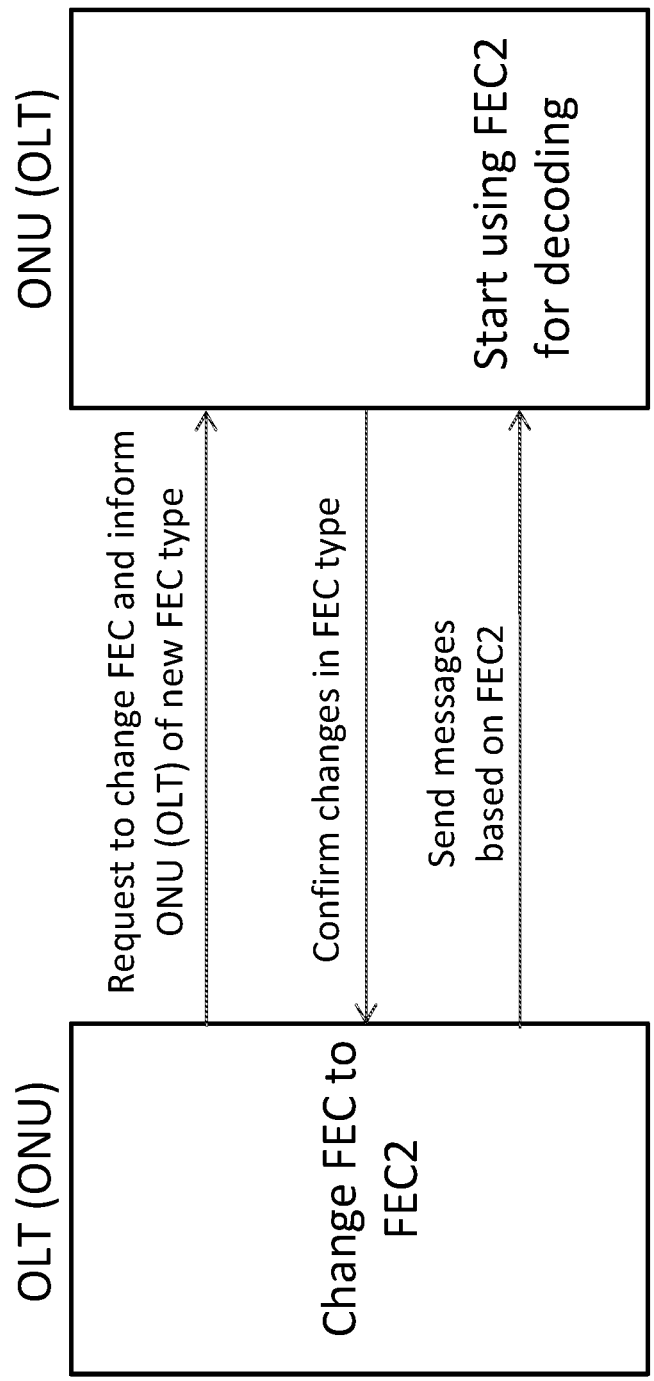
FIG. 6 shows an implementation example of distributed control, which allows both the OLT and optical network units (ONU) to make changes.

FIG. 6 shows an implementation example of distributed control, which allows both the OLT and the ONU to make changes to the FEC. In an implementation of the distributed control scheme, the OLT (or ONU) makes request first, and then the ONU (or OLT) confirms the request and makes changes to the FEC. The OLT (or ONU) informs the ONU (or OLT) that the FEC will change to FEC2 before or at the same time as making the changes without the need for confirmation. For example, the OLT (or ONU) informs the ONU (or OLT) that the FEC will change to the FEC2, which will take place in the next frame. The OLT (or ONU) makes the change and indicates the specifics in the frame header (e.g., preamble).

Figure 7:
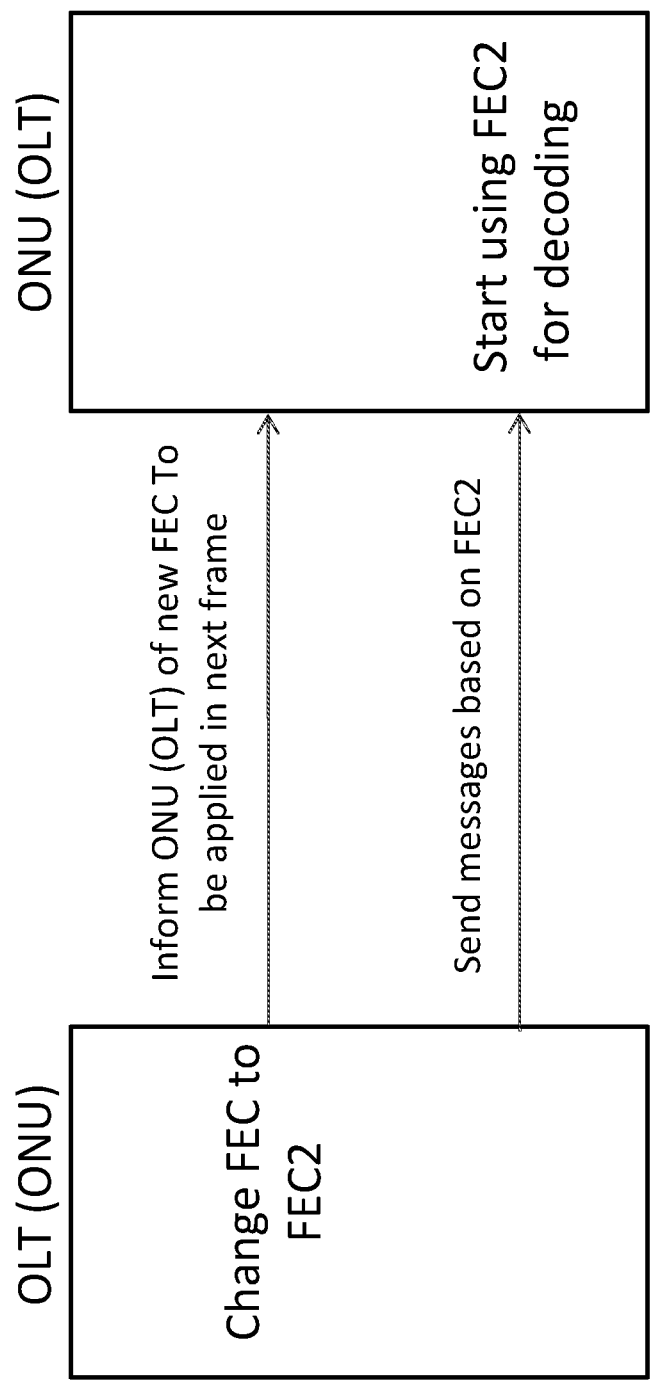
FIG. 7 shows another implementation example of distributed control scheme.

FIG. 7 shows another implementation example of distributed control scheme. In this implementation example, the OLT (or ONU) may inform the ONU (or OLT) that the OLT (or ONU) will make changes to the FEC, and then the changes take place in the next frame without the need for confirmation. For example, the OLT informs the ONUs that the FEC will change to the FEC2, and the OLT or ONU sends messages with the FEC2 in the next frame without waiting for the confirmation. Alternatively, one of the ONUs may inform the OLT that it will change the FEC. The ONU or the OLT sends messages with the FEC2 in the next frame without waiting for the confirmation, and the OLT or the ONU processes the received messages based on the FEC2, instead of the FEC.

Figure 8A:
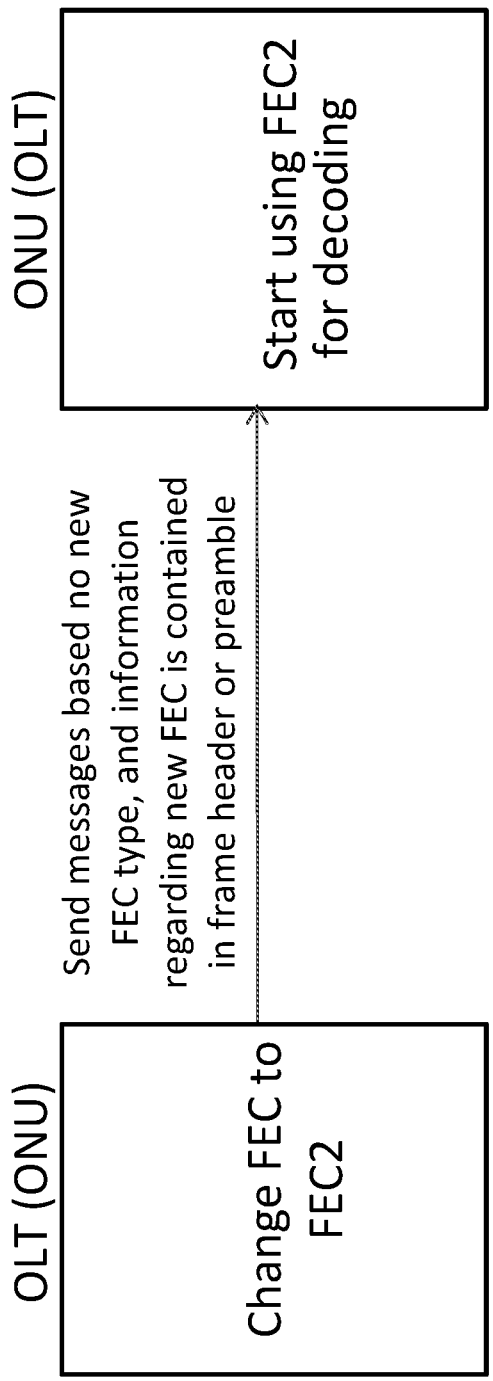
FIG. 8A shows yet another implementation example of distributed control scheme.

FIG. 8A shows another implementation example of distributed control scheme. The OLT (or ONU) may make the changes to the FEC and indicate the specifics in the frame header (e.g., preamble). In this implementation, either OLT or ONU can change the FEC to the FEC2. When the OLT or ONU receives messages, it checks the frame header of the message to see whether the message has FEC or FEC2. Both the ONU and OLT can read the FEC information carried in the frame header or preamble.

Figure 8B:
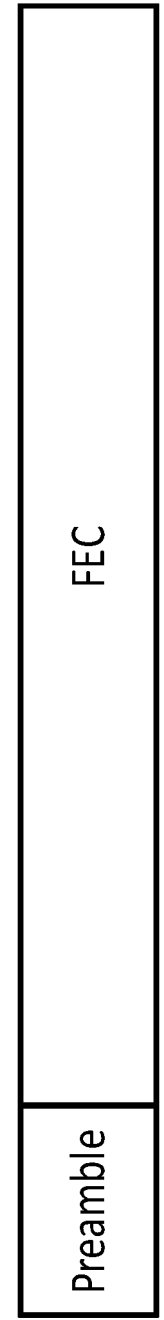
FIG. 8B shows how preambles can be used to indicate FEC information.

FIG. 8B shows how preambles can be used to indicate FEC information. To indicate the FEC information (e.g., type of FEC), a preamble can be used. The preamble can be a specific Delimiter Code, different FECs have different Delimiter Codes. The receiver matches the delimiter code to the specified FEC. It then selects the corresponding decoding method. The preamble can be a set of indicator bits under a specific known-FEC (FEC-1) protection to identify the FEC (FEC-2) used in the payload. FEC-1 can be the same as or different from FEC-2, as long as FEC-1 is pre-selected and known to both ONU and OLT.

Figure 9:
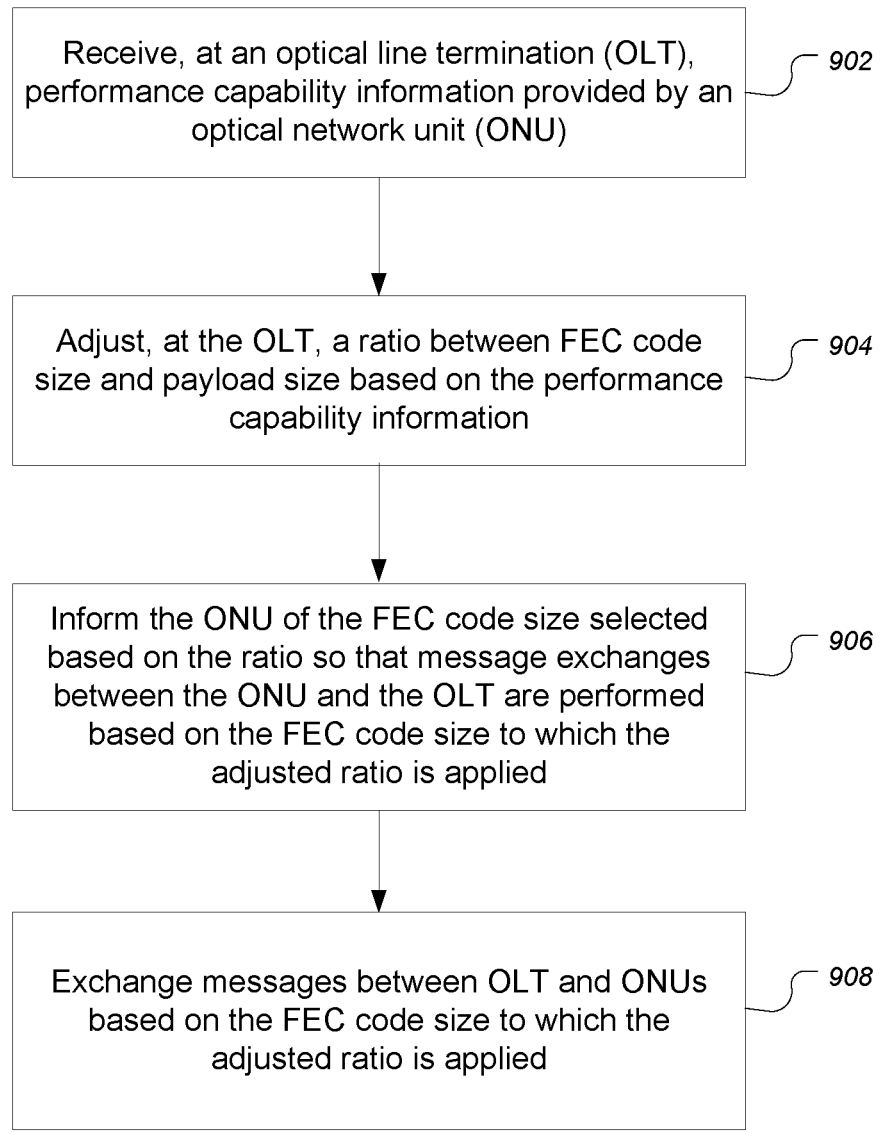
FIG. 9 is a flow chart representation of an example implementation of centralized control scheme of a method of communication using FEC code.

FIG. 9 is a flow chart representation of an example implementation of centralized control scheme of a method of communication using a forward error correction (FEC) code. At step 902, an OLT receives performance capability information provided by an ONU. At step 904, the OLT adjusts, at the OLT, a ratio between FEC code size and payload size based on the performance capability information. At step, 906, the OLT informs the ONU of the FEC code size selected based on the ratio so that message exchanges between the ONU and the OLT are performed based on the FEC code size to which the adjusted ratio is applied. Here, the ratio between FEC code size and payload size may be adjusted by a shortening process performed on the payload to reduce the payload size. The ratio between FEC code size and payload size may also be adjusted by a puncturing process performed on the FEC code to reduce the FEC code size. The ratio between FEC code size and payload size may be adjusted by matching the FEC code size within a frame size of a frame bursting communication protocol by a shortening process performed on the payload to reduce the payload size or by a puncturing process performed on the FEC code to reduce the FEC code size or a combination of the shortening process and the puncturing process. The ratio between FEC code size and payload size may be adjusted by separating shortened bits from the payload to reduce the payload size, by separating punctured bits from the FEC code to reduce the FEC code size, and by rearranging a remaining payload and a remaining FEC code. Here, the rearrangement is performed by rearranging the shortened bits, the punctured bits, the remaining payload, and the remaining FEC code in a sequence in which the punctured bits are transmitted first, followed by the shortened bits, the remaining FEC code, and the remaining payload.

Figure 10:
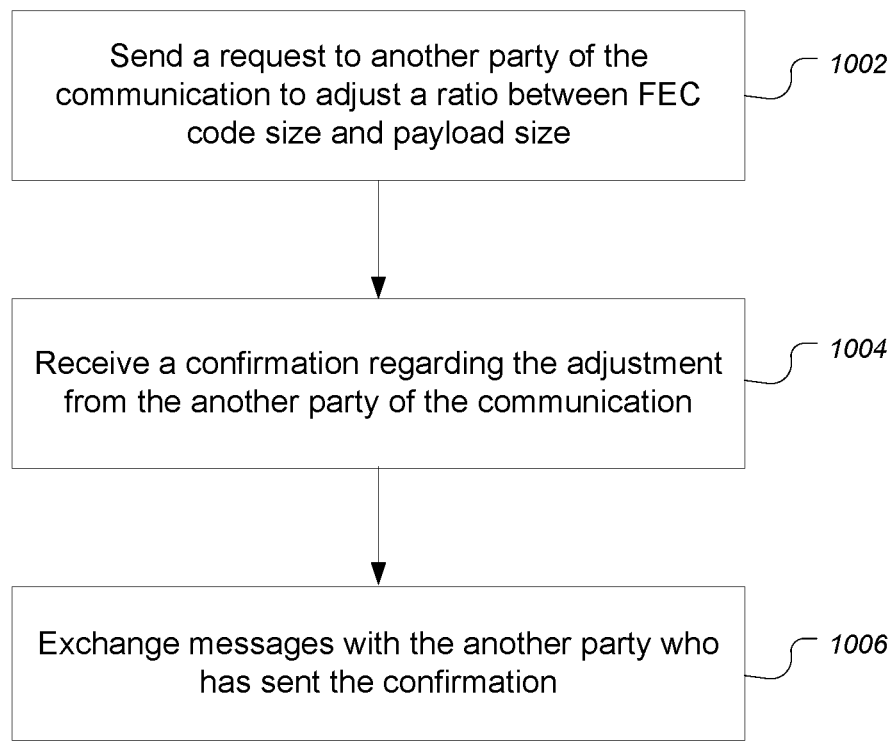
FIG. 10 is a flow chart representation of an example implementation of distributed control scheme of a method of communication using FEC code.

FIG. 10 is a flow chart representation of an example implementation of distributed control scheme of a method of communication using a forward error correction (FEC) code. At step 1002, a request is sent to another party of the communication to adjust a ratio between FEC code size and payload size. At step 1004, a confirmation regarding the adjustment is received from the other party of the communication. At step 1006, messages are exchanged with the other party who has sent the confirmation. Here, the at least two parties include an optical line terminal (OLT) and an optical network unit (ONU). The ratio between FEC code size and payload size may be adjusted by a shortening process performed on the payload to reduce the payload size. The ratio between FEC code size and payload size may also be adjusted by a puncturing process performed on the FEC code to reduce the FEC code size. The ratio between FEC code size and payload size may be adjusted by matching the FEC code size within a frame size of a frame bursting communication protocol by a shortening process performed on the payload to reduce the payload size or by a puncturing process performed on the FEC code to reduce the FEC code size or a combination of the shortening process and the puncturing process. The ratio between FEC code size and payload size may be adjusted by separating shortened bits from the payload to reduce the payload size, by separating punctured bits from the FEC code to reduce the FEC code size, and by rearranging a remaining payload and a remaining FEC code. Here, the rearrangement is performed by rearranging the shortened bits, the punctured bits, the remaining payload, and the remaining FEC code in a sequence in which the punctured bits are transmitted first, followed by the shortened bits, the remaining FEC code, and the remaining payload.

Figure 11:
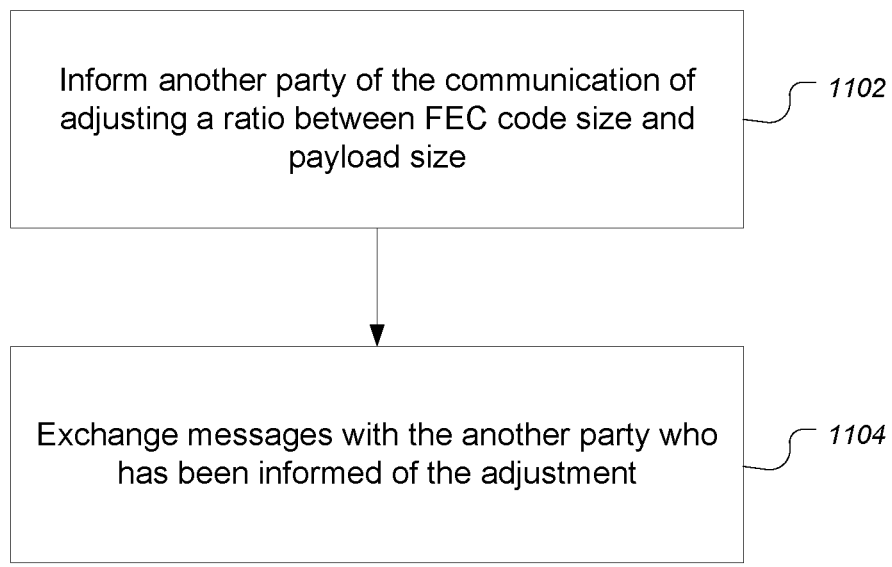
FIG. 11 is a flow chart representation of another example implementation of distributed control scheme of a method of communication using FEC code.

FIG. 11 is a flow chart representation of another example implementation of distributed control scheme of a method of communication using a forward error correction (FEC) code. At step 1102, a party informs another party of the communication of adjusting a ratio between FEC code size and payload size. At step 1104, messages are exchanged with the another party who has been informed of the adjustment. Here, the at least two parties include an optical line terminal (OLT) and an optical network unit (ONU). In an embodiment of the disclosed technology, the party may inform another party of the communication of adjusting a ratio between FEC code size and payload size by informing the another party of new FEC type to be applied in next frame. In another embodiment of the disclosed technology, the party may inform another party of the communication of adjusting a ratio between FEC code size and payload size by including, in messages to be sent, information regarding new FEC in a frame header or a preamble of the messages.

The ratio between FEC code size and payload size may be adjusted by a shortening process performed on the payload to reduce the payload size. The ratio between FEC code size and payload size may also be adjusted by a puncturing process performed on the FEC code to reduce the FEC code size. The ratio between FEC code size and payload size may be adjusted by matching the FEC code size within a frame size of a frame bursting communication protocol by a shortening process performed on the payload to reduce the payload size or by a puncturing process performed on the FEC code to reduce the FEC code size or a combination of the shortening process and the puncturing process. The ratio between FEC code size and payload size may be adjusted by separating shortened bits from the payload to reduce the payload size, by separating punctured bits from the FEC code to reduce the FEC code size, and by rearranging a remaining payload and a remaining FEC code. Here, the rearrangement is performed by rearranging the shortened bits, the punctured bits, the remaining payload, and the remaining FEC code in a sequence in which the punctured bits are transmitted first, followed by the shortened bits, the remaining FEC code, and the remaining payload.

Figure 12:
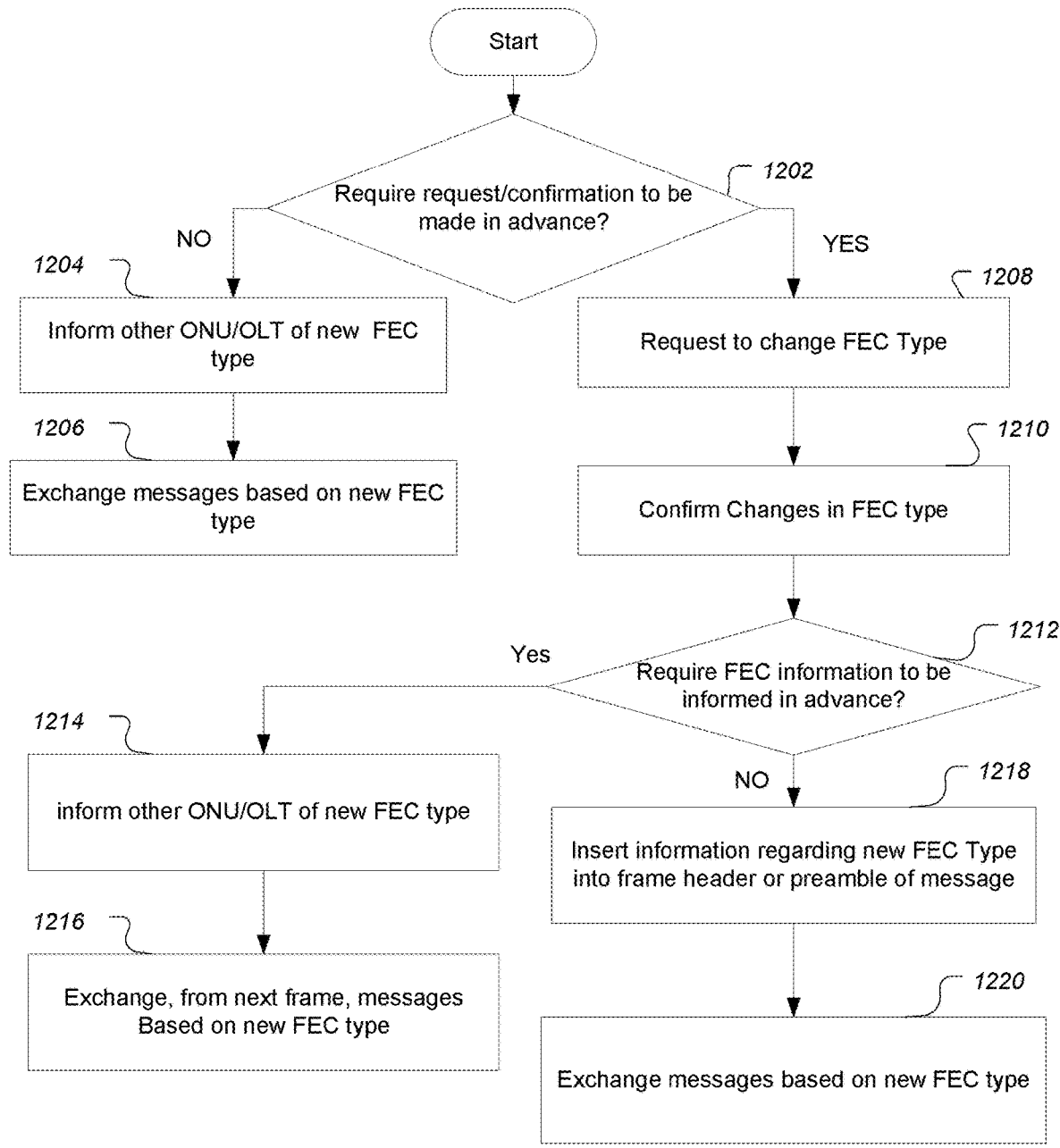
FIG. 12 is a flow chart representation of an example optical communication method.

FIG. 12 is a flow chart representation of an example implementation of distributed control scheme. At step 1202, it is determined whether a request/confirmation process must be done in advance of sending messages based on a new FEC type. If it is determined that the request/confirmation is not required, the ONU (or OLT) informs the OLT (or ONU) of new FEC type at step 1204, and after this point (e.g., at the step 1206), the ONU and the OLT may exchange messages based on new FEC type. At the step 1202, if it is determined that the request/confirmation process is required, a request is made by the ONU (or OLT) to change FEC type from FEC to FEC2 at step 1208. At step 1210, the OLT (or ONU) sends confirmation to the ONU (or OLT). At step 1212, it is determined whether FEC information must be provided in advance of exchanging messages based on new FEC type. If it is determined that the new FEC type must be informed before exchanging messages, at step 1214 the OLT (or ONU) inform other the ONU (or OLT) of new FEC type before sending messages based on the new FEC type at step 1216. If it is not required to inform other the ONU (or OLT) of new FEC type before exchanging messages, the OLT (or ONU) inserts information regarding new FEC type into a frame header or a preamble of a message at step 1218, and the OLT (or ONU) sends to ONU (or OLT) messages with the frame header having information regarding new FEC type at step 1220.

Figure 13:
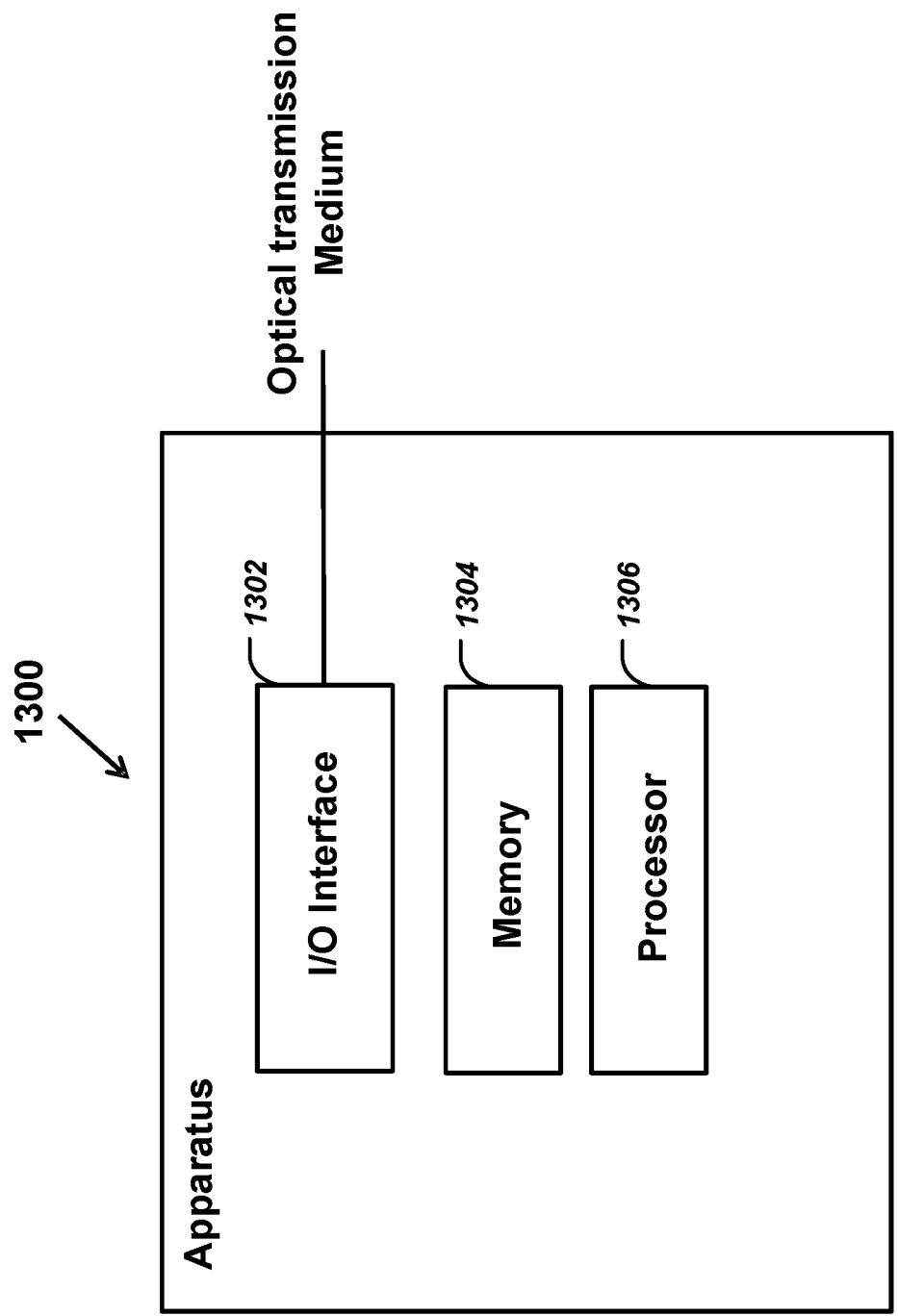
FIG. 13 shows an example optical transceiver apparatus implemented based on the disclosed technology.

FIG. 13 shows an example optical transceiver apparatus implemented based on the disclosed technology. The optical transceiver apparatus 1300 includes an I/O interface 1302 coupled via an optical transmission medium to another optical transceiver apparatus, a memory 1304 to store executable instructions, and a processor 1306 in communication with the receiver. The processor 1306 is configured to read the executable instructions from the memory to receive performance capability information provided by the another optical transceiver apparatus, adjust a ratio between a forward error correction (FEC) code size and a payload size based on the performance capability information, and inform the another optical transceiver apparatus of the FEC code size selected based on the ratio such that message exchanges between the optical transceiver apparatuses are performed using the FEC code size to which the ratio is applied. The optical transceiver may also perform the signal processing techniques discussed above.

In a passive optical network (PON), a single optical network may serve different ONUs having different requirements/tolerance levels of performance. A frame bursting scheme allows a transmitter to send a series of frames in succession to different ONUs having different levels of performance in terms of forward error correction (FEC) codeword.

As discussed above, in a passive optical network where different ONUs have different data rates or different modulation format, various embodiments of the disclosed technology may avoid burst errors by using shortening techniques and puncturing techniques. The disclosed technology also provides various embodiments regarding the centralized control scheme and the distributed control scheme to implement the shortening techniques and puncturing techniques.

The disclosed and other embodiments, algorithms, modules and the functional operations described in the present document can be implemented in digital electronic circuitry, or in computer software, firmware, or hardware, including the structures disclosed in the present document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "processor" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, which is generated to encode information for transmission to suitable receiver apparatus.

In implementing the modified mapping algorithm discussed in the present document, a computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in the present document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While the present document contains many specifics, these should not be construed as limitations on the scope of an invention that is claimed or of what may be claimed, but rather as descriptions of features specific to particular embodiments. Certain features that are described in present document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of communication using a forward error correction (FEC) code, comprising:
   receiving, at an optical line terminal (OLT), performance capability information provided by an optical network unit (ONU);
   adjusting, at the OLT, a ratio between an FEC code size and a payload size based on the performance capability information by performing at least one of a shortening process or a puncturing process based on a comparison between the FEC code size and a burst frame size or a comparison between a length of parity bits and a burst length; and
   informing the ONU of the FEC code size selected based on the ratio such that message exchanges between the ONU and the OLT are performed using the FEC code size to which the ratio is applied.

2. The method of claim 1, wherein the adjusting the ratio includes:
   performing a shortening process on the payload to reduce the payload size.

3. The method of claim 1, wherein the adjusting the ratio includes:
   performing a puncturing process on the FEC code to reduce the FEC code size.

4. The method of claim 1, wherein the adjusting the ratio between FEC code size and payload size includes matching the FEC code size within a frame size of a frame bursting communication protocol by a shortening process performed on the payload to reduce the payload size or by a puncturing process performed on the FEC code to reduce the FEC code size or a combination of the shortening process and the puncturing process.

5. The method of claim 1, wherein the adjusting the ratio between FEC code size and payload size includes:
   separating shortened bits from the payload to reduce the payload size;
   separating punctured bits from the FEC code to reduce the FEC code size; and
   rearranging a remaining payload and a remaining FEC code resulting from the separating operations.

6. The method of claim 5, the rearranging the remaining payload and the remaining FEC code includes rearranging the shortened bits, the punctured bits, the remaining payload, and the remaining FEC code in a sequence in which the punctured bits are transmitted first, followed by the shortened bits, the remaining FEC code, and the remaining payload.

7. A method of communication between at least two entities using a forward error correction (FEC) code, comprising:
   informing another entity of an adjustment to a ratio between an FEC code size and a payload size by performing at least one of a shortening process or a puncturing process based on a comparison between the FEC code size and a burst frame size or a comparison between a length of parity bits and a burst length; and exchanging messages with the other entity based on the adjusted ratio between the FEC code size and the payload size, wherein the at least two entities include an optical line terminal (OLT) and an optical network unit (ONU).

8. The method of claim 7, wherein the informing of the adjustment to the ratio between the FEC code size and the payload size comprises informing the other entity of a new FEC type to be applied in next frame.

9. The method of claim 7, wherein the informing of the adjustment to the ratio between FEC code size and payload size comprises sending messages that includes information regarding a new FEC in a frame header or a preamble of the messages.

10. The method of claim 7, wherein the ratio between the FEC code size and the payload size is adjusted by a shortening process performed on the payload to reduce the payload size.

11. The method of claim 7, wherein the ratio between the FEC code size and the payload size is adjusted by a puncturing process performed on the FEC code to reduce the FEC code size.

12. The method of claim 7, wherein the adjustment to the ratio between the FEC code size and the payload size includes matching the FEC code size within a frame size of a frame bursting communication protocol by a shortening process performed on the payload to reduce the payload size or by a puncturing process performed on the FEC code to reduce the FEC code size or a combination of the shortening process and the puncturing process.

13. The method of claim 7, wherein the adjustment to the ratio between the FEC code size and the payload size includes:

separating shortened bits from the payload to reduce the payload size;

separating punctured bits from the FEC code to reduce the FEC code size; and rearranging a remaining payload and a remaining FEC code.

14. The method of claim 13, the rearranging the remaining payload and the remaining FEC code includes rearranging the shortened bits, the punctured bits, the remaining payload, and the remaining FEC code in a sequence in which the punctured bits are transmitted first, followed by the shortened bits, the remaining FEC code, and the remaining payload.

15. The method of claim 7, wherein the informing of the adjustment to the ratio between the FEC code size and the payload size comprises:

receiving a request from the other entity for the adjustment to the ratio between the FEC code size and the payload size; and transmitting a confirmation regarding the adjustment to the other entity.

16. The method of claim 7, wherein the informing of the adjustment to the ratio between the FEC code size and the payload size comprises:

sending a request to the other entity for the adjustment to the ratio between the FEC code size and the payload size; and receiving a confirmation regarding the adjustment from the other entity.

17. An optical transceiver apparatus, comprising:

an I/O interface coupled via an optical transmission medium to another optical transceiver apparatus;

a memory to store executable instructions; and a processor in communication with a receiver, configured to read the executable instructions from the memory to:

receive performance capability information provided by the other optical transceiver apparatus;

adjust a ratio between a forward error correction (FEC) code size and a payload size based on the performance capability information by performing at least one of a shortening process or a puncturing process based on a comparison between the FEC code size and a burst frame size or a comparison between a length of parity bits and a burst length; and inform the other optical transceiver apparatus of the FEC code size selected based on the ratio such that message exchanges between the optical transceiver apparatuses are performed using the FEC code size to which the ratio is applied.

18. The apparatus of claim 17, wherein the adjusting the ratio between FEC code size and payload size includes matching the FEC code size within a frame size of a frame bursting communication protocol by a shortening process performed on the payload to reduce the payload size or by a puncturing process performed on the FEC code to reduce the FEC code size or a combination of the shortening process and the puncturing process.

19. The apparatus of claim 17, wherein the adjusting the ratio between FEC code size and payload size includes:

separating shortened bits from the payload to reduce the payload size;

separating punctured bits from the FEC code to reduce the FEC code size; and rearranging a remaining payload and a remaining FEC code resulting from the separating operations.

20. The apparatus of claim 19, the rearranging the remaining payload and the remaining FEC code includes rearranging the shortened bits, the punctured bits, the remaining payload, and the remaining FEC code in a sequence in which the punctured bits are transmitted first, followed by the shortened bits, the remaining FEC code, and the remaining payload.

* * * * *